Figure 1:
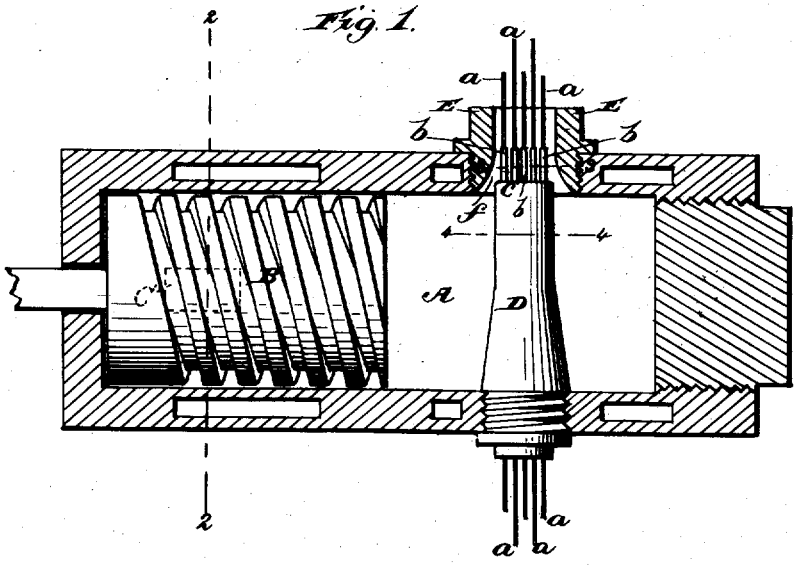

H. A. CLARK,

Assignor to THE CLARK INSULATED WIRE COMPANY.

MACHINE FOR COVERING WIRE WITH INSULATED MATERIAL.

No. 9,988. Reissued Dec. 27, 1881.

Witnesses.

Robt Emmett.

J. A. Rutherford

Inventor.

H. A. Clark.

By James L. Norris.

Atty.

UNITED STATES PATENT OFFICE.

HENRY A. CLARK, OF BOSTON, MASSACHUSETTS, ASSIGNOR TO THE CLARK INSULATED WIRE COMPANY, OF ELIZABETH, NEW JERSEY, BRISTOL, PENNSYLVANIA, AND BOSTON, MASSACHUSETTS.

MACHINE FOR COVERING WIRE WITH INSULATED MATERIAL.

SPECIFICATION forming part of Reissued Letters Patent No. 9,988, dated December 27, 1881.

Original No. 242,885, dated June 14, 1881. Application for reissue filed November 29, 1881.

DIVISION A.

*To all whom it may concern:*

Be it known that I, HENRY A. CLARK, of Boston, in the county of Suffolk and State of Massachusetts, have invented certain new and useful Improvements in Machines for Covering Wire with Insulating Material, of which the following is a full, clear, and exact description.

This invention relates more particularly to machines adapted for the covering of telegraph or telephone wire with an insulating material—as, for instance, india-rubber, gutta-percha, or restored waste india-rubber or gutta-percha in any of their vulcanizable or other compounds—and to that class of such machines as are constructed and arranged for the passage of wire axially through a circular opening in a die or head-block, and for the forcing at the same time of the material with which the wire is to be coated through the same die-opening in a manner to dispose and place such coating material about and around the wires; and as an illustration of this class of machines, reference is hereby had to the schedule annexed to and forming part of the Letters Patent of the United States issued to Thomas Sault, dated December 9, 1862, No. 37,112; and the object of this invention is to adapt such machine to the production and manufacture of a compound telegraph wire or cable, composed of a series of wires arranged in lines more or less parallel with but separated from each other, and for the purpose of insulation surrounded and inclosed as a whole, and also as to each of the series, with a homogeneous and one and the same mass of material or materials, such as aforesaid.

To that end this invention consists of a guide for the series of wires, having a distinct guide tube or way for each wire of the series, all of which guideways are arranged in lines parallel, or substantially so, with the axis or common opening in the die or head block, and open to such die-opening either at or within its mouth, and as to each other are constructed and arranged for the material which, with the series of wires, is forced through the common die-opening to circulate about and surround them as a whole, and also as to each other, and thus to be disposed at and about the series of wires as a whole, and as to each other where they leave and pass out of their guide-tubes into the common die-opening, all substantially as hereinafter described.

In the accompanying plate of drawings this invention is illustrated.

Figure 2:
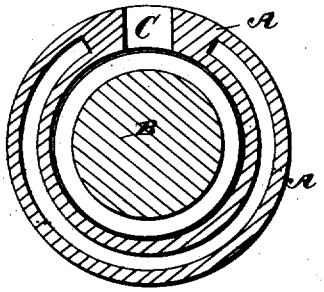
Figure 3:
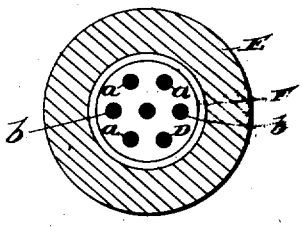
Figure 5:
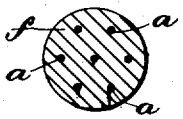
Figure 4:
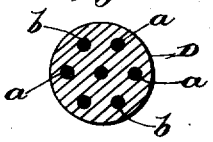

Figure 1 is a central longitudinal section. Figs. 2, 3, and 4 are transverse sections on lines 2 2, 3 3, and 4 4, respectively, of Fig. 1. Fig. 5 is a cross section of the compound telegraph wire or cable as produced by this machine.

In the drawings, A represents a chambered cylinder; B, a screw or worm arranged to turn within said cylinder; C, a hole which opens to the said screw intermediate of its length; D, a guide for the series of wires *a*, shown as running at right angles to the length of the screw B and cylinder A, and between the inner end of the screw and the closed head of the cylinder; E, the die or head block, having an opening, F, through it, which axially is coincident with the axial line of the wire-guide D. All of these parts above described are constructed and arranged for the passage of a wire through the wire-guide D into the die-opening F, and at the same time for the forcing of the insulating material under pressure in a plastic state through the die-opening as the wire passes through the same, all substantially (except as hereinafter described) the same as shown and described in the Letters Patent hereinbefore referred to.

The wire-guide D is provided with a series of guide ways or tubes, *b*, which run in the direction of its length and in parallel lines, and, as shown, in the present instance they are seven in number, arranged one at and along the axial line of the guide and the remainder in a circle about such central guide, and at equal distances apart. Each of these several guide-tubes is adapted for the free passage of a wire, and at the end *c* of the guide, which is toward the die-opening F, they each project and extend from the body portion *d* of the guide in parallel lines into the die-opening, and therein are separate and distinct from each other, so as to leave a free and open space between each of them and between them all and the wall of the die-opening F, which, of course, is made of sufficient diameter to admit the said series of wire-guide tubes and leave a space between them and the wall of the die-opening, as stated.

With a series of wire-guides, *b*, constructed and arranged in relation to each other and to the die-openings above described, obviously the material with which the several wires are to be insulated or coated, and in conjunction with which they are to pass through the die-opening, is forced around and circulates itself about the wire-guides *b* before reaching the wires which are issuing from the wire-guides at their open ends toward and within the die-opening, and as a consequence the insulating material in a plastic state is forced, pressed, or compacted, or molded in a continuous manner about and between the series of wires as they issue from their several guide-tubes, and between the wires and the wall of the die-opening, thereby securing a disposition or molding of the insulating material under pressure about and around the several wires, which material, so disposed, is in a homogeneous and in one and the same mass throughout. A separation of the wire-guides, as above described, before the wires issue from them and come into contact with the coating material being forced through the die-opening, and thus secure the disposition of the coating material relatively thereon, as above described, is absolutely essential, as otherwise the wires from the pressure of the coating material would be forced together, and thus the proper disposition of the coating material between and around and about them prevented.

Although I have herein particularly described the wire-guides as seven in number and arranged in a particular relation, it is plain that their number may be more or less and their relative arrangement varied, and therefore it is not intended to limit this invention to any particular number or to any particular relative arrangement of them, except that there is to be a series of wires, and practice has shown that seven wires can be simultaneously coated and covered with success, as described.

A compound wire or cable made as described is vulcanized, in order to preserve the disposition of the wires and of the insulating material specified, and also the proper form of the whole against derangement, and should be wrapped with cloth or other similar sheet material before vulcanizing it; but this obviously has no bearing upon my invention.

The wire-guide D, in lieu of being arranged at right angles to the line of direction of the screw or worm B and the chambered cylinder A, may be arranged in an axial line of the screw, as shown and described in the Letters Patent aforesaid. In Fig. 5, *a* are the wires, and *f* the coating or covering.

Having thus described my invention, what I claim, and desire to secure by Letters Patent, is—

In a machine of the class herein described, the combination of a series of wire-guides, *b*, constructed and arranged in relation to each other and to a common die-opening, F, substantially as and for the purpose and operation described.

In testimony whereof I have hereunto set my hand in the presence of the subscribing witnesses.

HENRY A. CLARK.

Witnesses:
ALBERT H. NORRIS,
JAMES A. RUTHERFORD.